United States Patent [19]

Bruton

[11] 4,328,698

[45] May 11, 1982

[54] PRESSURE CALIBRATION DEVICE

[76] Inventor: Durwood B. Bruton, 9916 Fieldcrest, Dallas, Tex. 75238

[21] Appl. No.: 184,538

[22] Filed: Sep. 5, 1980

[51] Int. Cl.³ .............................................. G01L 27/00
[52] U.S. Cl. ...................................................... 73/4 R
[58] Field of Search .................................. 73/4 R, 4 D

[56] References Cited

U.S. PATENT DOCUMENTS

| | | | |
|---|---|---|---|
| 180,625 | 8/1876 | Osborne | 73/4 R |
| 3,164,979 | 1/1965 | Siegel | 73/4 R |
| 4,051,712 | 10/1977 | Zias et al. | 73/4 R |

Primary Examiner—S. Clement Swisher
Attorney, Agent, or Firm—Hubbard, Thurman, Turner, Tucker & Glaser

[57] ABSTRACT

A device for calibrating and/or testing a pressure-responsive transducer comprises a piston and cylinder assembly connectable by a transducer dome to a pressure-sensitive face of the transducer. The piston and cylinder assembly comprises a relatively small diameter chamber through which a piston is controllably movable in air-tight contact with the interior wall of the chamber. The relatively small diameter chamber is in communication with a larger volume compression chamber, which is provided with an outlet port which is sealed an adaptor for connecting the piston and cylinder assembly to said dome.

The piston is manually movable through the small diameter chamber from a retracted position, in which the chamber is vented to ambient atmospheric pressure, through a series of predetermined intermediate positions, each of which corresponds to a known increased pressure value in the dome.

6 Claims, 2 Drawing Figures

PRESSURE CALIBRATION DEVICE

BACKGROUND OF THE INVENTION

The present invention relates to devices for calibrating and/or testing pressure-responsive transducers, for example, transducers used in equipment for monitoring blood pressure.

Such pressure-responsive transducers comprise a diaphragm which, in use, is exposed to the pressure to be measured and which is moved thereby an amount related to the magnitude of the applied pressure. The movement is converted into an analogue electrical signal, the magnitude of which represents the magnitude of the applied pressure.

Before such a device is used, and periodically during its use, it is necessary to calibrate and/or test the transducer by exposing it to known pressures and checking the signal generated thereby. The operation and construction of such pressure-responsive transducers is well known and, as it does not form part of the present invention, will not be described in further detail in this specification.

It is an object of this invention to provide a novel construction of a calibration/testing device for use with a pressure-responsive transducer.

It is a further object of the invention to provide a calibration/testing device which is simple, but reliable in operation and yet relatively inexpensive in construction.

Prior devices for testing and calibrating blood pressure monitoring equipment comprise means for applying a reference pressure from a suitable source to the diaphragm of the transducer while simultaneously measuring the applied pressure with, for example, a mercury manometer or some other precision pressure gauge. It will be apparent that such a device is time-consuming in operation.

It is also an object of the invention to provide a device for use with blood pressure monitoring equipment that is expeditious for calibration and set-up and periodic reverification and test of the monitoring equipment.

It is a yet further object of the invention to provide a device which can generate systolic/diostolic type pressure waves.

SUMMARY OF THE INVENTION

According to the present invention, a device for calibrating and/or testing pressure responsive transducers comprises a piston and cylinder assembly. The cylinder comprises a relatively small diameter chamber, through which said piston travels, and a larger volume compression chamber in communication therewith. The piston is in sealing engagement with the walls of said small diameter chamber and means are provided for moving the piston through said chamber from a retracted position in which the chamber communicates with atmospheric pressure or other reference pressure to a number of pre-selected positions within the chamber, each corresponding to a predetermined pressure above the atmospheric or other reference pressure at an outlet port of said compression chamber.

Preferably, mechanical means are provided for releasably retaining the piston at each of said positions.

The operation, features and advantages of the invention will become more evident from the following description of the preferred embodiment, which is offered by way of example only, taken in conjunction with the accompanying drawings.

DESCRIPTION OF THE PREFERRED EMBODIMENT

Figure 1:
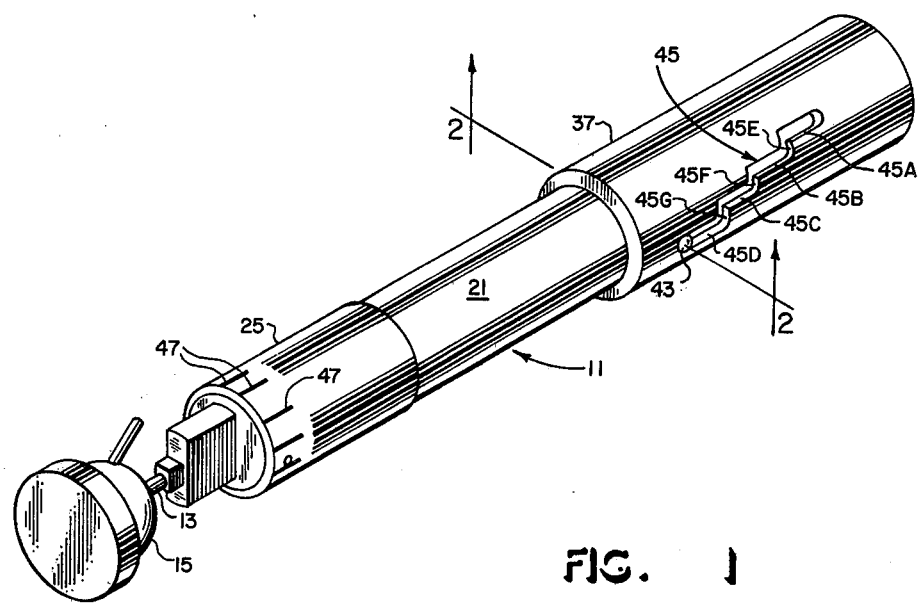
FIG. 1 is a perspective view of a testing/calibrating device embodying the invention.
Figure 2:
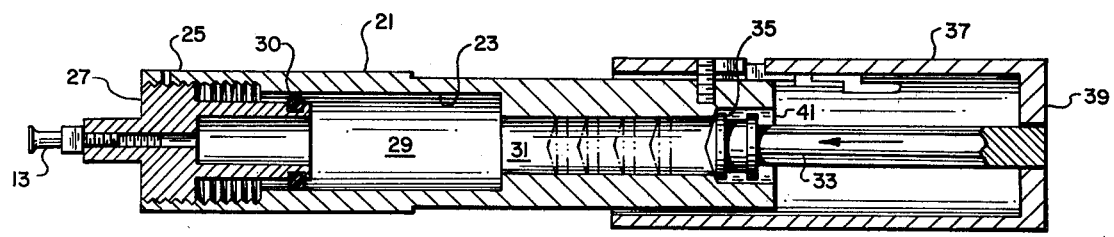
FIG. 2 is a section on the line II—II of FIG. 1.

Referring to FIG. 1, the device of the present invention comprises a piston and cylinder assembly 11, which is connected via an adaptor 13 to a transducer dome 15 which, in turn, is connected to a pressure-responsive transducer 17 forming part of blood-pressure monitoring equipment (not shown).

The piston and cylinder assembly 11 comprises a cylindrical barrel 21 of suitable plastic material, such as LEXAN, which has a cylindrical internal bore 23 extending therethrough. The bore 23 is of stepped configuration to provide within the barrel 21 a number of chambers of different diameter. A first end 25 of the barrel 21 is formed with an internal screw thread and an end plug 27, having an externally screw-threaded portion, is secured therein.

The end plug 27 has a shank portion 28 which extends into the bore 23 of the barrel 21 and which carries an "O" ring 30 located in a groove in the shank portion 28. The "O" ring 30 provides an air-tight seal at the end of the bore 23. The end plug 27 carries the adaptor 13. The portion of the bore 23 extending from the end plug 27 is of relatively large diameter and constitutes a compression chamber 29 of the device. At the end of the chamber 29 remote from the end plug 27, the bore 23 is stepped inwardly so that the remaining portion of the bore 23 constitutes a working chamber 31 of relatively small diameter.

Within the working chamber 31 is accommodated a reciprocable piston 33, which carries at its forward end a deformable seal 35 ensuring air-tight contact between the piston 33 and the internal walls of the chamber 31. The piston 33 is carried by an outer cylindrical sleeve 37, which has a closed end wall 39 to which the end of the piston 33 is connected by means of engaged screw-threads on the two parts. The piston 33 is disposed co-axially within the sleeve 37, which surrounds the rear end of the barrel 21. Preferably, the engagement of the piston 33 within the chamber provides the means of locating the sleeve 37 and there is a small clearance between the inner wall of the sleeve 37 and the outer wall of the cylindrical member 21.

At its rear end, the bore 23 has a vent portion 41 of larger diameter than the portion 31 such that when the piston 33 is withdrawn from the working chamber 31 to the fullest extent permitted, it enters the portion 41, allowing an annular vent to be opened around the periphery of the seal 35 connecting the interior of the chamber 31 to ambient atmospheric pressure.

The extent of movement of the piston 33 in the working chamber 31 is governed by a pin 43 extending radially outwardly from the cylindrical member 21 and disposed towards the rear end of the cylindrical member 21. The pin 43 extends through a slot 45 formed in the sleeve 37. As seen in FIG. 1, the slot comprises four discrete portions 45A through 45D which extend axially with respect to the sleeve 37. Adjacent portions 45A through 45D are joined by portions 45E through 45G of the slot, which extend circumferentially around the sleeve 37.

As discussed above, the working chamber 31 has a small internal diameter compared with that of the compression chamber 29 and, in a typical embodiment, the volume of the chamber 31 is approximately 5 cc and the volume of the chamber 29 approximately 15 cc. The exact volume of the compression chamber 29 can be adjusted by axial movement of the end plug 27. It will be appreciated that the small diameter of the chamber 31 ensures that relatively large axial movements of the piston 33 are required to effect significant changes in the pressure at the outlet of the chamber 29, so that the device has high sensitivity in operation.

The device constructed and arranged as described above is dimensioned so that the successive movements of the piston 33 through the chamber 31 from the vented position cause increases in pressure of 50 mm of mercury, 100 mm of mercury, 150 mm of mercury and 200 mm of mercury respectively at 45G, 45F, 45E and the end of 45A. If necessary, the volume of the chamber 31 can be adjusted during assembly by selecting the exact position of the piston 33 with respect to the end of the sleeve 37, prior to securing those parts together by a suitable adhesive. The position of the end plug 27 is also pre-set in manufacture to calibrate the device to a prevailing barometric pressure in the place where the device will be used.

Further adjustment of the device is normally made on site, i.e. in the hospital or doctor's office. To perform this on-site calibration, the transducer of the blood-pressure monitoring equipment is first calibrated by connecting it to a disposable dome which is, in turn, connected to a mercury manometer. The manometer is then operated to produce a pressure of 200 mm and the trace thus produced is noted. The manometer is then disconnected from the dome and the adaptor 13 of the device connected in its place. The device embodying the invention is then operated, several times, from the vented to the 200 mm of mercury position, and the trace produced by the calibrated transducer again noted. If necessary, the end plug 27 is rotated to vary the volume of the chamber 33 until, on three successive operations, the correct trace for 200 mm of mercury pressure is produced. An atmospheric pressure scale 47, marked in inches of mercury, provided on an adhesive-backed strip of plastic, is then attached around the front end of the cylindrical barrel 21 with a zero marking opposite a mark provided on the face of the plug 27. The device is now set up for operation at the prevailing barometric pressure and will remain substantially correctly calibrated virtually indefinitely. It is customary, at this stage, to obtain a value for the prevailing barometric pressure. If, at a later time that pressure has changed, the device can be adjusted by rotating the plug 27 the required amount, as measured by the scale 47, to compensate for the change in barometric pressure.

The device may advantageously be employed to generate a variable pressure wave similar to the systolic/diostolic wave produced by the human blood circulation system. This is done by repeated cycling of the plunger 33 between the positions defined by, say, the slot portion 45F and the forward end of the slot portion 45C. The trace from the pressure wave generated in this way is observed to check that the blood pressure monitoring equipment is functioning properly in response to a systolic/diostolic pressure wave. Moreover, the device operated in this way can be used as a teaching aid to demonstrate the trace to be expected during blood pressure measurements.

In use, the device is initially adjusted with the piston 33 withdrawn to the fullest extent into the venting portion 41, so that the working chamber 31 and hence the compression chamber 29 are vented to ambient atmospheric pressure. In this position, the pin 43 rests at the outer end of the axially extending portion 45D of the slot 45. The piston 33 is then moved into the working chamber 31, by a distance governed by the length of the portion 45D of the slot 45, deforming the seal 35 into sealing contact with the wall of the chamber 31 and shutting off the chamber from atmospheric pressure. At the end of 45D, the circumferentially extending portion 45G of the slot acts as a stop preventing further movement of the piston 33 into the working chamber 31 until the sleeve 37 is rotated with respect to the member 21, enabling the pin 43 to travel over the portion 45G of the slot 45. It will be appreciated that the configuration of the slot 45 provides positive stops between the fully withdrawn and fully inserted positions of the piston 33 with respect to the working chamber 31.

In an alternative embodiment, venting of the chamber 31 is achieved by means of a radial passage extending through the wall of the chamber 31 near its rear end. The passage is so positioned that it is in front of the seal 35 when the piston is withdrawn to its fullest extent, connecting the chamber 31 to ambient atmospheric pressure, and to the rear of the seal 35 when the piston is moved into the chamber 31. In this embodiment, the vent portion 41 of larger diameter is not required.

While the above description has illustrated use of the device with air and ambient atmospheric pressure as a medium, it is equally possible to operate using some other gas, such as sterile nitrogen, supplied to the device from a source of reference pressure, so that when the chamber 31 is vented, it is connected to said source.

It will be appreciated that instead of connecting the adaptor 13 directly to the transducer dome 15, a length of flexible tubing may be employed connected at one end to the adaptor 13 and at the other end to the transducer dome.

What is claimed is:

1. A device for calibrating and/or testing a pressure-responsive transducer comprising:
    a first, relatively large volume, gas-tight chamber having an outlet for connecting the device to a pressure responsive transducer;
    a second, elongate, gas-tight chamber in fluid communication with said first chamber;
    wall means movable longitudinally through the second chamber to vary the effective gas-tight volume of the second chamber;
    vent means for connecting the interior of the second chamber to ambient when the wall is at the end of the chamber;
    means for moving said wall means through said chamber; and
    means for indicating the amount of movement of the wall through the chamber and hence the increase in pressure at the said outlet.

2. A device for calibrating and/or testing a pressure-responsive transducer comprising a barrel member having a stepped internal bore defining a large diameter chamber and an elongate, smaller diameter chamber, a piston movable through said small diameter chamber to vary the effective volume thereof and means for indicating the extent of movement of the piston through the chamber and hence the increase of pressure within the bore.

3. A device according to claim 2 wherein the piston is secured by its outer end to a sleeve which surrounds the small diameter chamber of said member, and cooperative pin-and-slot means are provided on the member and the sleeve to guide and limit the movement of the sleeve, and hence of the piston, with respect to the small diameter chamber.

4. A device according to claim 2, wherein the slot includes several axially extending portions interconnected by circumferentially extending portions.

5. A device according to claim 2 wherein the large diameter chamber is closed at its end remote from the smaller chamber by a plug which extends into the chamber and is axially movable to vary the volume of said large diameter chamber whereby the device may be adjusted to compensate for variations in ambient barometric pressure.

6. A device according to claim 2 wherein the smaller diameter chamber has vent means for connecting the interior of the chamber to the surrounding atmosphere, the vent means being so positioned that the chamber is vented to atmosphere at one extreme of movement of the wall means only.

* * * * *